Patented Dec. 24, 1929

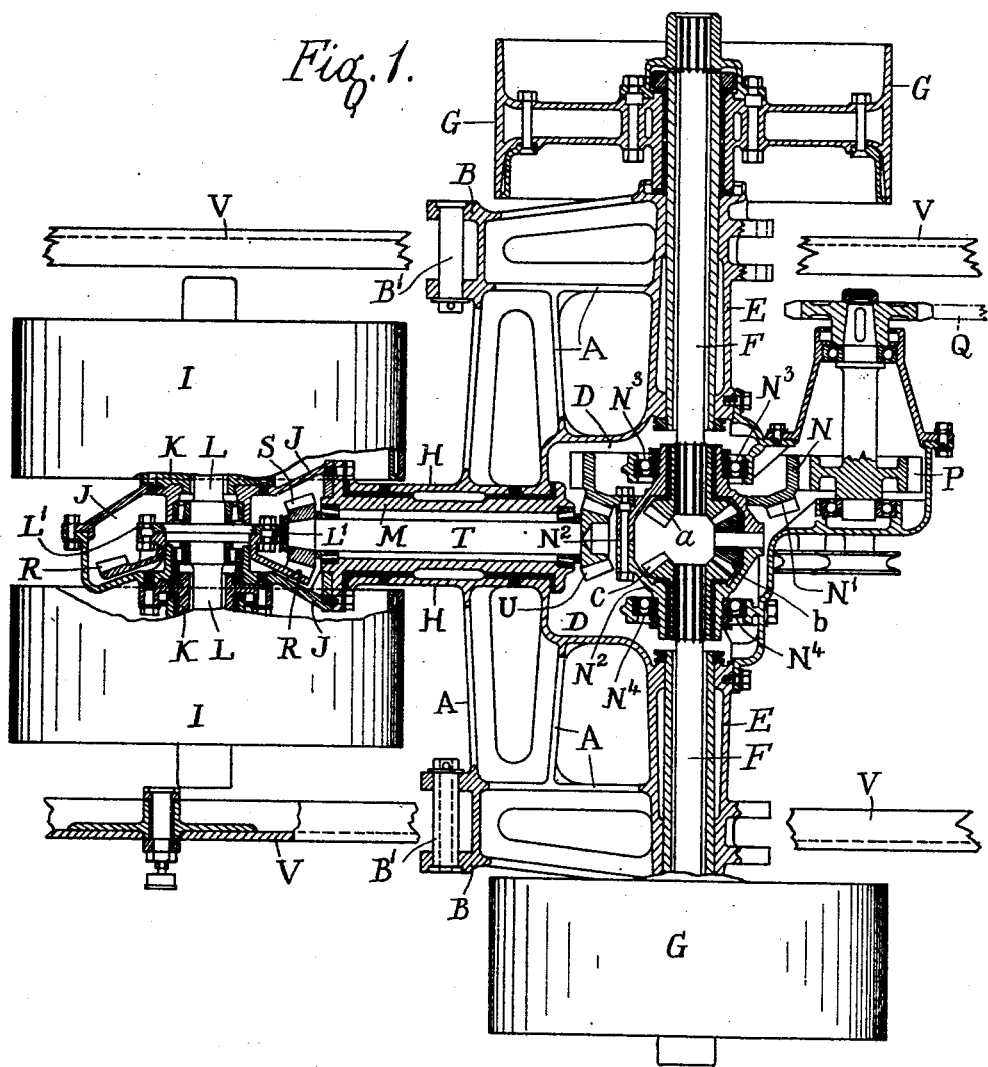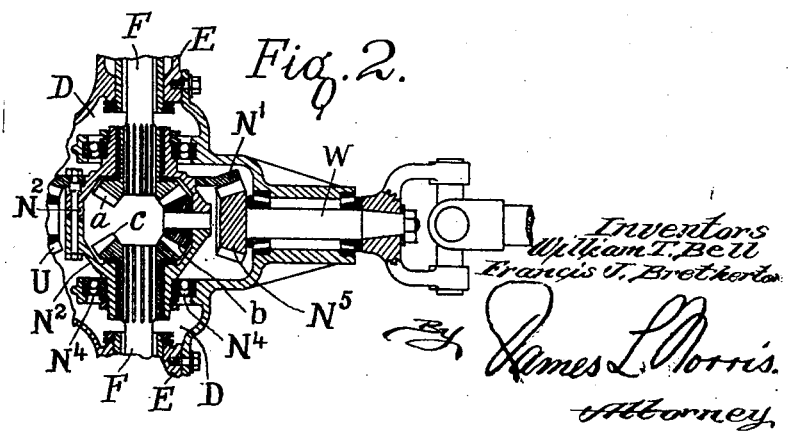

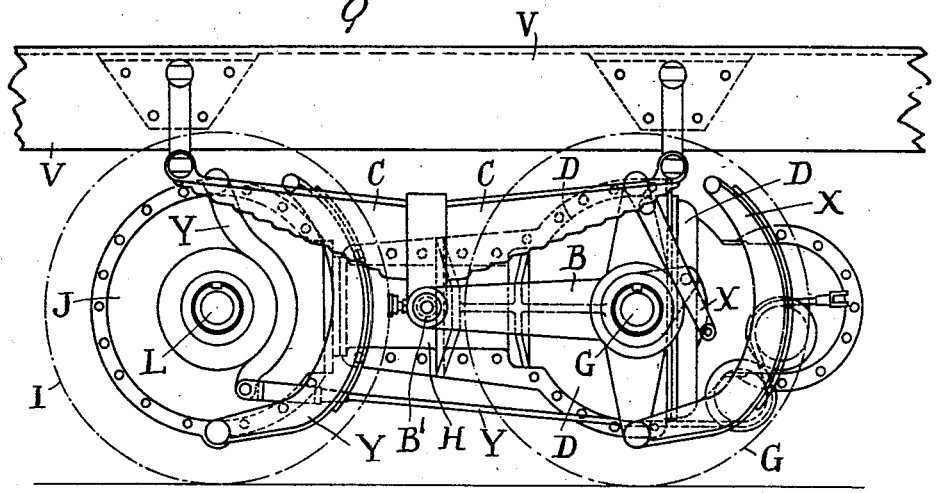
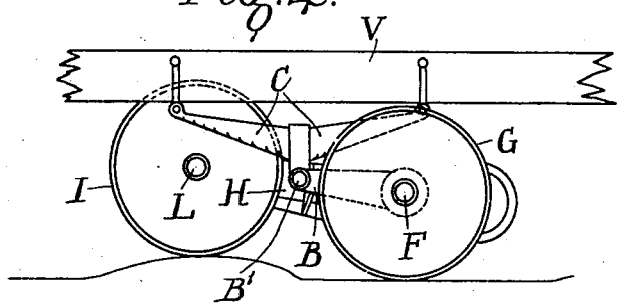
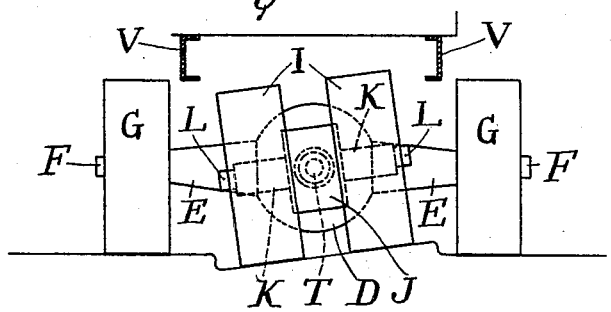

1,741,091

UNITED STATES PATENT OFFICE

WILLIAM THOMAS BELL, OF LINCOLN COUNTY, AND FRANCIS JAMES BRETHERTON, OF LONDON, ENGLAND

MECHANICALLY-PROPELLED VEHICLE

Application filed March 7, 1929, Serial No. 345,114, and in Great Britain January 13, 1928.

The invention relates to that class of mechanically propelled vehicles known as "rigid six wheel vehicles"; that is the driving (generally the rear wheels) comprise two pairs of wheels positioned near each other, and has for its object to provide a flexible mounting or suspension so that the four wheels are always in contact with the road or other surface on which they travel, irrespective of any undulations or uneven surface, and at the same time the load on the springs is equally distributed over the four wheels.

According to this invention we secure to the chassis or frame of the vehicle, two ordinary leaf springs, i. e. one on each side of the vehicle and secured at their ends to the chassis or frame in any suitable manner, and to the centre of these springs we secure a frame or casting which is positioned across the chassis, and such frame or casting is constructed to include or carry the differential gear for the main pair of drive wheels and the axles of such wheels and with a means for rotatably receiving and holding the box or fittings for the other pair of drive wheels so arranged that the axles of the two pairs of wheels can have a rotatable movement in relation to each other.

The frame or casting and the box or fitting, when assembled, are so arranged that the frame or casting is secured to the centres of the springs at mid-distance between the axles of the two pairs of wheels, whereby the four wheels have an up and down vertical movement against the springs. The two pairs of wheels have a rocking movement with the springs and the back pair of wheels have a rotatable movement in relation to the front pair of wheels so that practically a universal movement is obtained.

The drive between the two pairs of wheels is by suitable means such as a bevel wheel drive.

We prefer to arrange for one pair of wheels to be positioned outside the chassis or frame as is usual and for the other pair of wheels to be inside the chassis or frame.

The invention will be clearly understood from the following description aided by the example shown on the annexed drawings in which:—

Figure 1 is a sectional plan of a frame or casting carrying the gearing and axles with the wheels and indicating the position they occupy in the chassis or vehicle frame, the wheels and gear being driven by chain drive.

Figure 2 is a sectional plan of a differential gear driven by pinion drive through universal coupling.

Figure 3 is a side elevation of the appliances and a portion of a chassis to which they are connected.

Figure 4 is a side elevation similar to Figure 3 indicating the position of the wheels when travelling over rough ground.

Figure 5 is a front elevation of the wheels and section of a chassis showing another position of the wheels when travelling over rough ground.

According to the example shown on the drawings, we construct the frame or casting A with a projection B, B on each side near the back edge by which through the pins $B^1$, $B^1$ the frame A can be connected to the springs C and in such frame A at about the centre and the front form the differential gear box D, and at each side at the front the axle casings E, E communicating with the gear box D, in which the axles F, F of the front pair of wheels G, G are carried. On the centre of such frame or casting A and at the back we form or provide a tubular projection H leading from the gear box D.

In connection with the back pair of wheels I, I we employ a box or fitting which is formed as a box J for carrying the driving gear (or if necessary the differential gear), with axle bearings K, K in which the back axle L or axles is or are carried, the axle L having a flange $L^1$ to which is bolted the wheel R, and such box or fitting K is constructed or provided with a tubular connection M leading from the box J which is positioned in the tubular projection H on the frame or bracket A (but it may be over the projection H), and rotatably secured therein or thereon in any suitable manner.

The driving gear may be of any suitable kind, and in the form shown in Figure 1 is a pinion wheel N formed on a bevel wheel N¹ connected to a box N² carrying the differential gear $a$, $b$, $c$, said box N² revolving in bearings N³, N⁴, in the gear box D, and such pinion wheel N is driven by another wheel P driven from the motive power through a chain Q, Figure 1, but in Figure 2, the pinion N is dispensed with and the bevel wheel N¹ is driven by a bevel pinion N⁵ on a shaft W, but any other drive may be employed.

The back pair of wheels I, I is provided with a bevel wheel R driven from a smaller bevel wheel S carried on one end of a shaft T positioned in the tubular projection M on the frame and box J and the other end of such shaft T is connected to a small bevel wheel U, which in turn gears with the wheel N. If necessary a differential gear can be provided for the back wheels.

The front pair of wheels G, G are positioned outside the chassis or frame V and the back wheels on the inside of the chassis or frame V, by which construction, the two axles F, F, L, L can be positioned at the minimum distance apart.

X is the brake mechanism for the wheels G, G and Y the brake mechanism for the wheels I, I, both being operated by the driver in the usual manner.

By this construction both sets of wheels G, G and I, I can have imparted to them a rocking motion up and down about the pins B¹, B¹, as also a further up and down movement due to the action of the springs C, C, but the wheels I, I can also have a rocking movement in the tubular projection H at right angles to the other rocking movement so that the wheels can always have contact with the road irrespective of its undulations and the chassis will always be kept in its proper position without being materially tilted as will be understood from Figures 4 and 5, the load being equally distributed over the four wheels.

What we do claim as our invention and desire to obtain by Letters Patent is:—

1. In a mechanically propelled vehicle having a chassis frame and two pairs of driving wheels and driving axles therefor spaced transversely of their axes, an axle carrying frame comprising sections carrying respectively the axles for the different pairs of wheels and having means connecting them to rotate on an axis transverse to said axles and rigidly connecting them transversely of said axis, springs supporting the chassis frame and bearing on the axle carrying frame at points between the axles for the pairs of wheels, and driving means connecting the axles for the pairs of driving wheels.

2. In a mechanically propelled vehicle having a chassis frame and two pairs of driving wheels and driving axles therefor spaced transversely of their axes, an axle carrying frame comprising sections carrying respectively the axles for the different pairs of wheels and having means connecting them to rotate on an axis transverse to said axles and rigidly connecting them transversely of said axis, one of said axle carrying frame sections having spring supports rigidly connected to and located at opposite sides of said connecting means for said sections and between the axles for the different pairs of wheels, springs supporting the chassis frame and bearing on said spring supports, and driving means connecting the axles for the pairs of driving wheels.

3. In a mechanically propelled vehicle having a chassis frame embodying side members, two pairs of driving wheels and driving axles therefor, one pair of driving wheels being outside the chassis frame and the other pair of driving wheels being between the side members of said frame, an axle carrying frame comprising sections carrying respectively the axles for the different pairs of driving wheels and having means connecting them to rotate on an axis transverse to said axles and rigidly connecting them transversely of said axis, the section carrying the axles for the pair of driving wheels which are outside the chassis frame having spring supports thereon located at opposite sides of the means connecting the axle carrying sections and between the driving axles for the different pairs of driving wheels, springs supporting the side members of the chassis frame and engaging the respective spring supports on said axle carrying frame, and driving means connecting the axles for the pairs of driving wheels.

In testimony whereof we have hereunto set our hands.

WILLIAM THOMAS BELL.
FRANCIS JAMES BRETHERTON.